June 17, 1924.                    1,498,028
E. E. GALLOGLY
LOCK
Filed Feb. 18, 1921
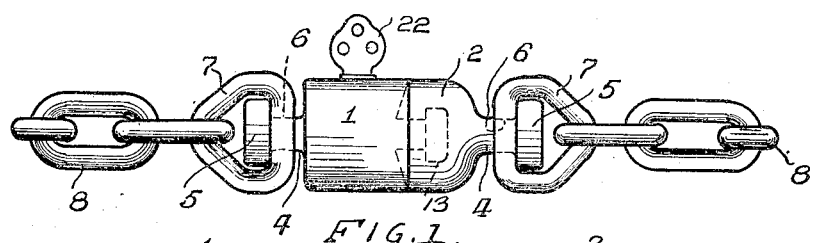
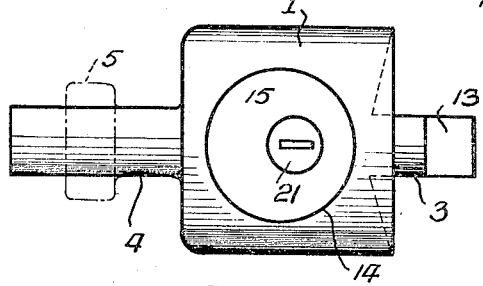
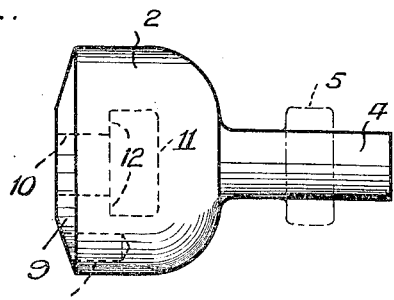
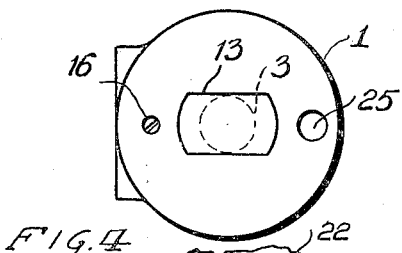
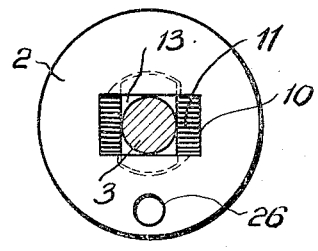
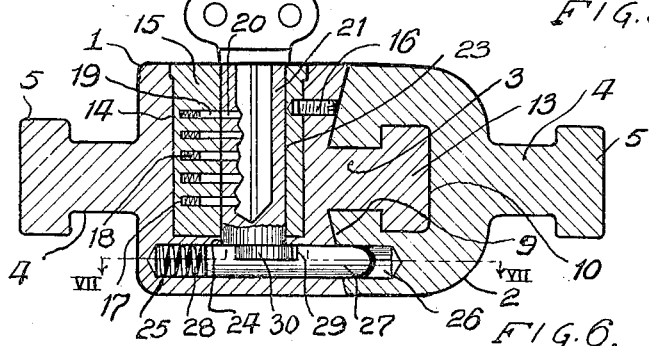
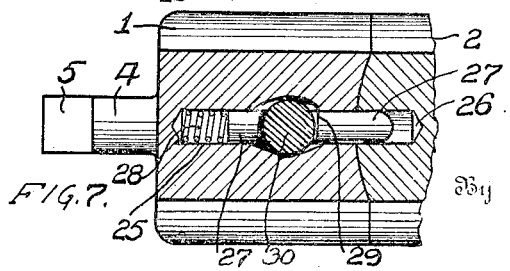
Inventor
ELMER E. GALLOGLY.
Attorneys Patented June 17, 1924.

1,498,028

UNITED STATES PATENT OFFICE.

ELMER E. GALLOGLY, OF DETROIT, MICHIGAN.

LOCK.

Application filed February 18, 1921. Serial No. 445,973.

*To all whom it may concern:*

Be it known that I, ELMER E. GALLOGLY, a citizen of the United States of America, residing at Detroit, in the county of Wayne and State of Michigan, have invented certain new and useful Improvements in Locks, of which the following is a specification, reference being had therein to the accompanying drawings.

My lock may be advantageously used for connecting the ends of a chain or flexible member, and the chain or flexible member may be advantageously used for encircling a fixed member and a detachable member so that the detachable member cannot be surreptitiously removed from the fixed member. As instances of the use of such an encircling locking device may be mentioned that of retaining a spare tire on a carrier so that it cannot be stolen, and connecting a vehicle wheel to a spring or other part of an automobile chassis so that the vehicle cannot be used by an unauthorized person, or for joining the ends of non-skid tire chains.

My invention aims to provide separable lock members that may be easily and quickly locked together to connect the ends of a chain or flexible member, and the lock members are designed so as to constitute a swiveled link or member of the chain to permit of the chain being handled without any danger of the lock being injured.

My invention further aims to provide lock members articulated by a turn bolt which establishes a strong connection between the lock members, and a pin, controlled by a key mechanism, is employed for securing the lock members together so that the same cannot be separated, after having been locked, except by the use of a key.

The construction entering into my invention will be hereinafter specifically described and then claimed, and reference will now be had to the drawings, wherein—

Figure 1 is a side elevation of the lock as connecting the ends of a chain;

Fig. 2 is a plan of the bolt member of the lock;

Fig. 3 is a similar view of the socket member of the lock;

Fig. 4 an end view of the bolt member;

Fig. 5 is an end view of the socket member showing a portion of a bolt therein;

Fig. 6 is a longitudinal sectional view of the lock, and

Fig. 7 is a horizontal sectional view taken on the line VII—VII of Fig. 6.

In the drawing, the reference numeral 1 denotes a bolt member, and 2 is a socket member adapted to receive a bolt 3 of the bolt member so that the inner ends of said members may abut and afford substantially a cylindrical lock body. The outer ends of the members 1 and 2 are provided with shanks 4 that may have the outer ends thereof upset or enlarged to provide heads 5 after the shanks 4 have been placed in openings 6 of links 7 forming part of a chain or flexible member 8. The shanks 4, heads 5 and links 7 afford swivels for the bolt and socket members 1 and 2 respectively, thus permitting of each member rotating relative to its end of the chain 8, and when the members 1 and 2 are connected the body thus formed may rotate and constitute a connecting link in the chain or flexible member 8.

The socket member 2 has a convexed or tapered inner end provided with an axial opening 10 that is rectangular in cross section and this opening communicates with a recess 11 in the socket member 2 with the recess providing opposed shoulders 12 behind which the substantially rectangular head 13 of the bolt 3 may lodge and thus retain the bolt 3 in engagement with the socket member.

The bolt member 1 has its inner end concaved or tapered inwardly from its peripheral edges to the bolt 3 so as to receive the convex or tapered end 9 of the socket member 2, and a portion of the bolt 3 is cylindrical with its outer end supporting the head 13. With the members 1 and 2 correctly positioned relative to each other, the head 13 may pass through the opening 10 of the socket member 2 and then by partially rotating or turning the bolt member 1 a quarter of a revolution, the ends of the head 13 may be placed behind the shoulders 12 of the recess 11, thus preventing withdrawal of the bolt from the opening 10 and the recess 11, said bolt constituting a strong and durable member between the members 1 and 2. By reference to Fig. 5, it will be noted that the recess 11 is formed so that the bolt 3 must be rotated in a defined direction to place the head 13 in a plane at a right angle to the horizontal plane of the opening 10, and in consequence of the shape of the recess 11 it is possible for the operator of the lock to positively determine when the bolt 3 is in a locked position relative to the socket member 2.

In the bolt member 1 is a bore 14 having its longitudinal axis at a right angle to the axis of the bolt member 1, and in said bore is a detachable and normally stationary tumbler member 15 which is retained within the bore 14 by a screw 16 countersunk in the end of the bolt member 1, and covered by the member 2 to make it inaccessible when locked.

In the tumbler member 15 are a series of pockets 17, containing coiled compression springs 18, and outer tumblers or plungers 19 which abut inner tumblers or plungers 20 in a rotatable key member 21 adapted to receive a key 22. A proper key will actuate the tumblers 20 and place the abutting ends of the tumblers 19 and 20 in alinement with the wall of the key member 21, so that said key member may be rotated to lock the bolt and socket members together or release the same. The key member 21 is rotatable in a longitudinal eccentrically disposed bore 23 in the tumbler member 15, and the bore 23 communicates with an opening 24 in the bottom of the bore 14.

In the bolt member 1 and communicating with the opening 24 is a pin pocket 25 adapted to communicate with a pocket 26, in the socket member 2, and slidably mounted in the pin pocket 25 is a locking pin 27 which is normally pressed by a coiled expansion spring 28 located in the inner end of the pocket 25. The locking pin 27 has a transverse groove 29 to receive a cam 30 eccentrically disposed on the lower end of the rotatable key member 21, and when the cam member 30 is turned by rotating the key member 21 the locking pin 27 may be retracted relative to the socket member 2, so that the bolt and socket members may be further manipulated and separated.

With the locking pin 27, extending into the pocket 26 of the socket member 2, it is impossible to separate the members 1 and 2, until a proper key is inserted in the key member and this key member rotated to retract the locking pin 27, and with the convex end of the socket member extending into the concaved end of the bolt member, it is practically impossible to insert a cold chisel or saw, or other tool between the bolt and socket members to separate said members. Then again, the exterior shape of the bolt and socket members provides a lock body that will withstand considerable wear and tear just as much as the links of the chain 8, and it is obvious that a chain may be employed having closed or filled links, which will prevent a tool from being used to pry or saw, the links apart. With the lock made of strong and durable material it will withstand the rough usage to which a chain is ordinarily subjected, and with a high grade of tumbler and key mechanism associated with the lock it is practically impossible to pick or surreptitiously open the lock.

It is thought that the utility of my invention will be apparent without further description, and while in the drawing there is illustrated a preferred embodiment of the lock, it is to be understood that the structural elements are susceptible to such variations and modifications as fall within the scope of the appended claims.

What I claim is:—

1. A lock comprising members of equal diameter having adjoining flush ends and uninterrupted walls, a T bolt axially of one member and extending into the other member and adapted by rotation to connect and bring the ends of said members into abutting relation, a locking pin carried by one member parallel to said bolt and adapted to be moved into the other member to prevent rotation of one member relative to the other, and key mechanism in the bolt member intersecting the axis of said bolt and adapted for moving said locking pin.

2. A lock as in claim 1, characterized by said locking pin being spring pressed, and a cam operatable in the side of said locking pin by said key mechanism adapted to retract said locking pin.

In testimony whereof I affix my signature in presence of two witnesses.

ELMER E. GALLOGLY.

Witnesses:
W. CHAPIN,
L. R. TREESH.